United States Patent
Yamaguchi

(10) Patent No.: US 7,826,105 B2
(45) Date of Patent: Nov. 2, 2010

(54) IMAGE PROCESSING APPARATUS, AND METHOD FOR CONTROLLING RETURN SPEED OF IMAGE READING UNIT THEREFORE

(75) Inventor: Hiroshi Yamaguchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1084 days.

(21) Appl. No.: 11/520,678

(22) Filed: Sep. 14, 2006

(65) Prior Publication Data

US 2007/0058219 A1    Mar. 15, 2007

(30) Foreign Application Priority Data

Sep. 15, 2005   (JP)   ............... 2005-268394

(51) Int. Cl.
*H04N 1/04* (2006.01)

(52) U.S. Cl. .................. 358/474; 358/497; 358/486; 382/318; 382/319

(58) Field of Classification Search ........... 358/474, 358/497, 486, 462, 448; 382/318, 319
See application file for complete search history.

(56) References Cited

U.S. PATENT DOCUMENTS

| | | | | |
|---|---|---|---|---|
| 5,943,139 | A * | 8/1999 | Tang et al. | 358/412 |
| 6,278,101 | B1 * | 8/2001 | Puyot | 250/208.1 |
| 6,747,765 | B2 * | 6/2004 | Kitamura et al. | 358/497 |
| 7,006,260 | B2 * | 2/2006 | Sato et al. | 358/448 |
| 7,206,103 | B2 * | 4/2007 | Sakaguchi | 358/474 |
| 7,551,330 | B2 * | 6/2009 | Yamada et al. | 358/474 |
| 7,679,794 | B2 * | 3/2010 | Tamai et al. | 358/497 |
| 2001/0043372 | A1 * | 11/2001 | Suzuki et al. | 358/474 |
| 2002/0075529 | A1 * | 6/2002 | Sato et al. | 358/505 |
| 2003/0193542 | A1 * | 10/2003 | Kasahara | 347/37 |
| 2004/0184115 | A1 * | 9/2004 | Suzuki | 358/474 |
| 2004/0223194 | A1 * | 11/2004 | Naito et al. | 358/497 |
| 2006/0023265 | A1 * | 2/2006 | Yoon | 358/474 |
| 2006/0023267 | A1 * | 2/2006 | Ikeno et al. | 358/474 |
| 2006/0285179 | A1 * | 12/2006 | Yamada et al. | 358/497 |
| 2006/0285182 | A1 * | 12/2006 | Suzuki et al. | 358/532 |

FOREIGN PATENT DOCUMENTS

| | | |
|---|---|---|
| JP | 8-146529 A | 6/1996 |
| JP | 10-271280 A | 10/1998 |
| JP | 11-146144 | 5/1999 |
| JP | 200-019656 | 1/2000 |
| JP | 2005-234357 A | 9/2005 |

OTHER PUBLICATIONS

JP Office Action dtd Oct. 7, 2008, JP Appln. 2005-268394.

* cited by examiner

*Primary Examiner*—Negussie Worku
(74) *Attorney, Agent, or Firm*—Banner & Witcoff, Ltd.

(57) ABSTRACT

Any one of a plurality of modes such as a scanner function, a copy function, a facsimile function and the like can be set, and an operation mode of an image reading unit at the time of its image reading operation is judged. A return speed of the image reading unit for returning to a reference position after completion of the scanning is set at a speed corresponding to the operation mode. As a result, a machine sound generated when the image reading unit moves does not cause a user to feel uncomfortable, and the waiting time until the next document reading can be shortened.

10 Claims, 10 Drawing Sheets

IMAGE PROCESSING APPARATUS, AND METHOD FOR CONTROLLING RETURN SPEED OF IMAGE READING UNIT THEREFORE

CROSS-REFERENCE TO RELATED APPLICATIONS

This Nonprovisional application claims priority under 35 U.S.C. §119(a) on Patent Application No. 2005-268394 filed in Japan on Sep. 15, 2005, the entire contents of which are hereby incorporated by reference.

BACKGROUND OF THE INVENTION

1. Field of the Invention

The present invention relates to an image processing apparatus that reads an image of a document by moving an image reading unit from a reference position along the document in a predetermined direction for scanning. In addition, the present invention relates to a method for controlling a return speed of the image forming unit at returning to a home position (reference position) after completion of scanning.

2. Description of the Related Art

A scanner, a facsimile, a printer, a copying machine and a composite apparatus (called also an MFD: Multi-Function Device) executing these functions comprise an image reading unit for reading a document as image data. In general, the image reading unit comprises an image sensor such as a CCD (Charge Coupled Device) or a CIS (Contact Image Sensor) and this sensor is arranged just under a contact glass such that the light receiving surface of the image sensor is opposed to the contact glass. In addition, the image reading unit supports the image sensor so as to be capable of reciprocally move along the document placed on the contact glass. Accordingly, the image reading unit obtains image data by receiving driving force of a motor and moving the image sensor along the document for scanning while converting received light to electric data.

In addition, the image sensor is controlled to return a home position, that is, a reference position in which it was positioned before scanning, at a predetermined return speed so as to read the image of the next document placed on the contact glass.

As a scanner control apparatus for controlling the return speed, a prior art disclosed in Japanese Patent Application Laid-Open No. 2001-19656 is well known. According to the scanner control apparatus in the prior art, the return speed is changed according to a moved distance of a scanner (image sensor) in scanning a document. In addition, Japanese Patent Application Laid-Open No. 11-146144 (1999) discloses a scanner drive control apparatus that can reduce an oscillating quantity of an image forming apparatus body by changing accelerated velocity when a scanner returns to its home position according to the moved distance of the scanner such that the oscillating quantity of the image forming apparatus may become minimum.

BRIEF SUMMARY OF THE INVENTION

Meanwhile, when the composite apparatus is set in an operation mode in which an image is formed on a recording paper based on read image data of a document (refer to as the "copy mode" hereinafter), the image of the document is read by an image reading unit after a start key has been inputted and the image is formed on the recording paper based on the read image. Since various kinds of driving components are driven by driving force of a motor and the like at the time of image reading and image forming, a machine sound is generated at that time. For example, there are generated a driving sound of the motor itself, driving sounds of conveying components such as a gear, a belt and a pulley, and driving sounds of driven components such as a print head, a conveyance roller and a fan.

The source of the machine sound generated at the time of image reading is limited to the motor, the belt and the gear for driving the image reading unit. Meanwhile, at the time of image forming, the machine sound is generated from the driving components such as the motor, a process unit, the print head and conveyance rollers, and the belts and gears for driving those driving components. Therefore, in general, the machine sound generated when the image is formed is louder than that generated when the image is read.

In addition, when the composite apparatus is set in an operation mode in which the read image data of the document is transferred to an internal storage device or an external storage device (referred to as the "scanner mode" hereinafter), only a machine sound caused by the image reading is generated. More specifically, a machine sound is generated when the image sensor of the image reading unit is moved at the time of scanning the whole document, and a machine sound is generated when it returns to a home position after completion of the scanning.

In the above-described copy mode, the driving speeds of the plurality of driving components such as the process unit and conveyance rollers driven at the time of image forming are unambiguously determined according to a resolution and the like previously set for the image forming. Furthermore, in the above-described scanner mode, the moving speed at the time of scanning is unambiguously determined according to the reading resolution of the image sensor. Meanwhile, a return speed has been set constantly in the conventional example. For example, according to the existing general composite apparatus, the return speed has been set to about the same as the moving speed at the time of scanning when a medium degree of reading resolution is set.

However, when the moving speed of the image sensor at the time of scanning becomes higher than the return speed because a low reading resolution is set, the machine sound generated at the time of returning is smaller than the machine sound at the time of scanning. Thus, when the return speed is set at the constant speed lower than the moving speed at the time of scanning, a user does not feel uncomfortable because of the noise. However, in this case, the slowness of the return speed becomes noticeable and the user feels that a waiting time until the next reading of a document is long, which is a problem.

In addition, when the copy mode is set, while the image sensor returns to its home position after completion of scanning, the image forming process generates a loud machine sound. Therefore, the machine sound generated at the time of returning operation is covered with the machine sound generated at the time of image forming process. In this case, when the return speed is dynamically changed, the above-described waiting time can be shortened without disturbing the user with the noise. However, according to the prior art, the control such that the return speed is changed without disturbing the user with the noise is not executed.

In addition, although the technique for changing the return speed is disclosed in each documents of the prior art described above, since the return speed is changed only according to the moved distance of the scanner in scanning the document, the above problem cannot be solved.

The present invention was made in view of the above problems, and it is an object of the present invention to provide an image processing apparatus, and a method for controlling a return speed of an image reading unit in which both problem regarding that a user feels uncomfortable with a noise, and problem regarding that a waiting time until the next document reading is long are solved.

The present invention is a method for controlling a return speed of an image reading unit of an image processing apparatus to a reference position, and the image processing apparatus comprises the image reading unit for reading an image of a document by scanning the document placed on a document table, and a driving unit for moving the image reading unit from the reference position along the document in a predetermined direction, and operating in one operation mode of the plurality of operation modes, and is characterized by comprising the steps of judging the set operation mode when the image reading unit reads the image; setting a return speed of the image reading unit at returning to the reference position after completion of scanning to a speed corresponding to the judged operation mode; and controlling the driving unit based on the set speed.

And the present invention is an image processing apparatus comprising an image reading unit for reading an image of a document by scanning the document placed on a document table, and a driving unit for moving the image reading unit from a reference position along the document in a predetermined direction, and operating in one operation mode of the plurality of operation modes, and is characterized by comprising: a mode setting unit that sets one of the plurality of operation modes; a mode judging unit that judges the operation mode set by the mode setting unit when the image reading unit reads the image; a return speed setting unit that sets a return speed of the image reading unit at returning to the reference position after completion of scanning, to a speed corresponding to the operation mode judged by the mode judging unit; and a drive control unit that controls the driving unit based on the speed set by the return speed setting unit.

According to an image forming apparatus in the present invention, an image reading unit is provided so as to be able to move along a document placed on a document reading table in the apparatus. The image reading unit is connected to a driving unit for driving it. When a drive control unit controls the driving unit, the image reading unit is moved.

While the image reading unit is moved from a predetermined reference position along the document in a predetermined direction by the driving unit, the image reading unit scans the document, whereby the image of the document is read out. The image reading unit after completion of scanning returns to the reference position.

As an operation mode of the image processing apparatus, when the image processing apparatus is a multi-function device comprising a plurality of functions, a plurality of modes corresponding to the functions such as a scanner mode, a copy mode (image forming mode), a print mode, a facsimile mode (including a facsimile transmission mode and a facsimile reception mode) are considered. In addition, a fan operating mode, a low-resolution reading mode, a high-resolution reading mode or the like is also considered as one example of the operation mode. In addition, the operation mode of the image processing apparatus is set by a mode setting unit. Meanwhile, the operation mode of the apparatus at the time of image reading operation is judged by a mode judging unit.

When the operation mode of the apparatus at the time of image reading operation is judged, a speed corresponding to the judged operation mode is set to a return speed. Based on the set speed, the drive unit is controlled by the drive control unit. Thus, the image reading unit returns to the reference position at the set return speed.

The above and further objects and features of the invention will more fully be apparent from the following detailed description with accompanying drawings.

DETAILED DESCRIPTION OF THE PRESENT INVENTION

First Embodiment

Embodiments of the present invention will be described with reference to the drawings hereinafter.

Figure 1:
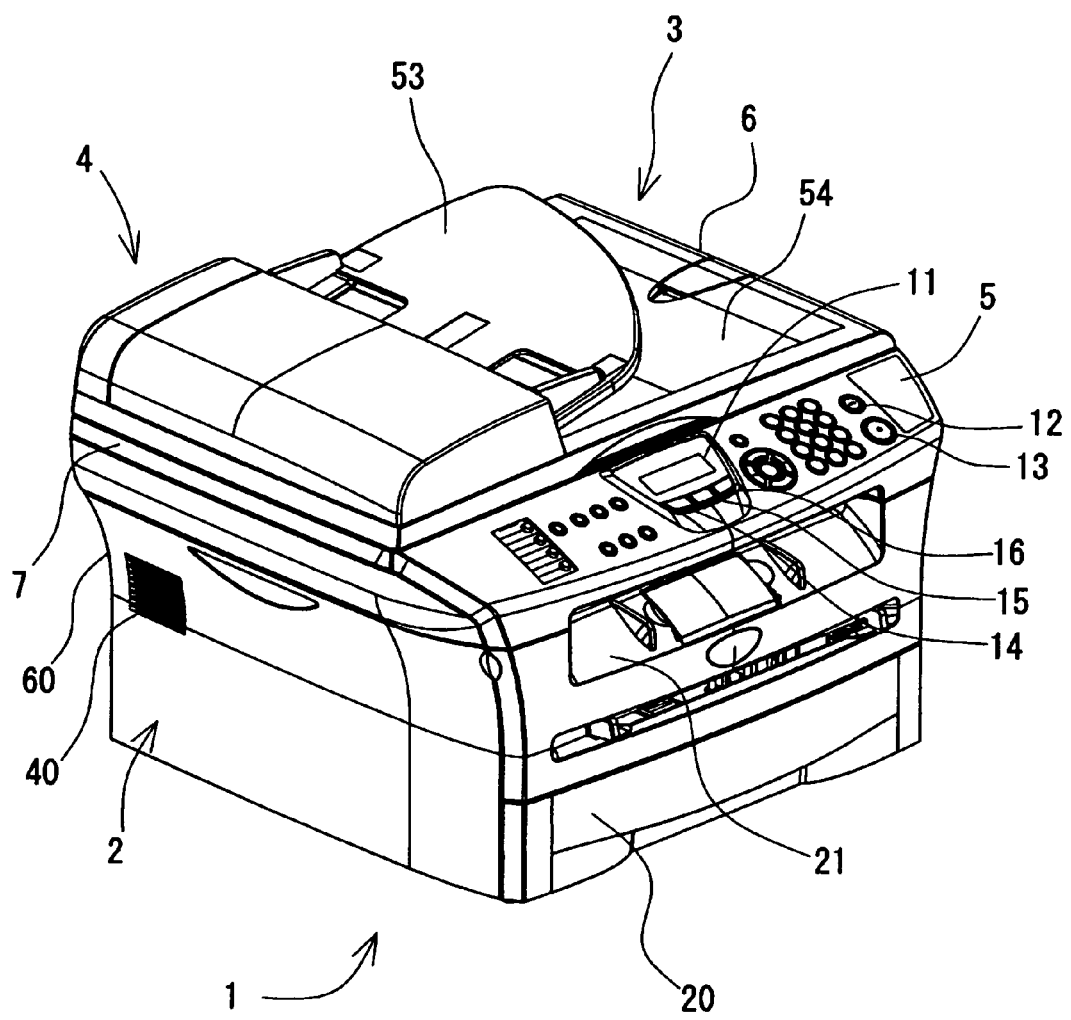
FIG. 1 is a schematic perspective view showing an outer configuration of a composite apparatus that is one example of an image processing apparatus according to the first embodiment of the present invention in which a document cover is closed.
Figure 2:
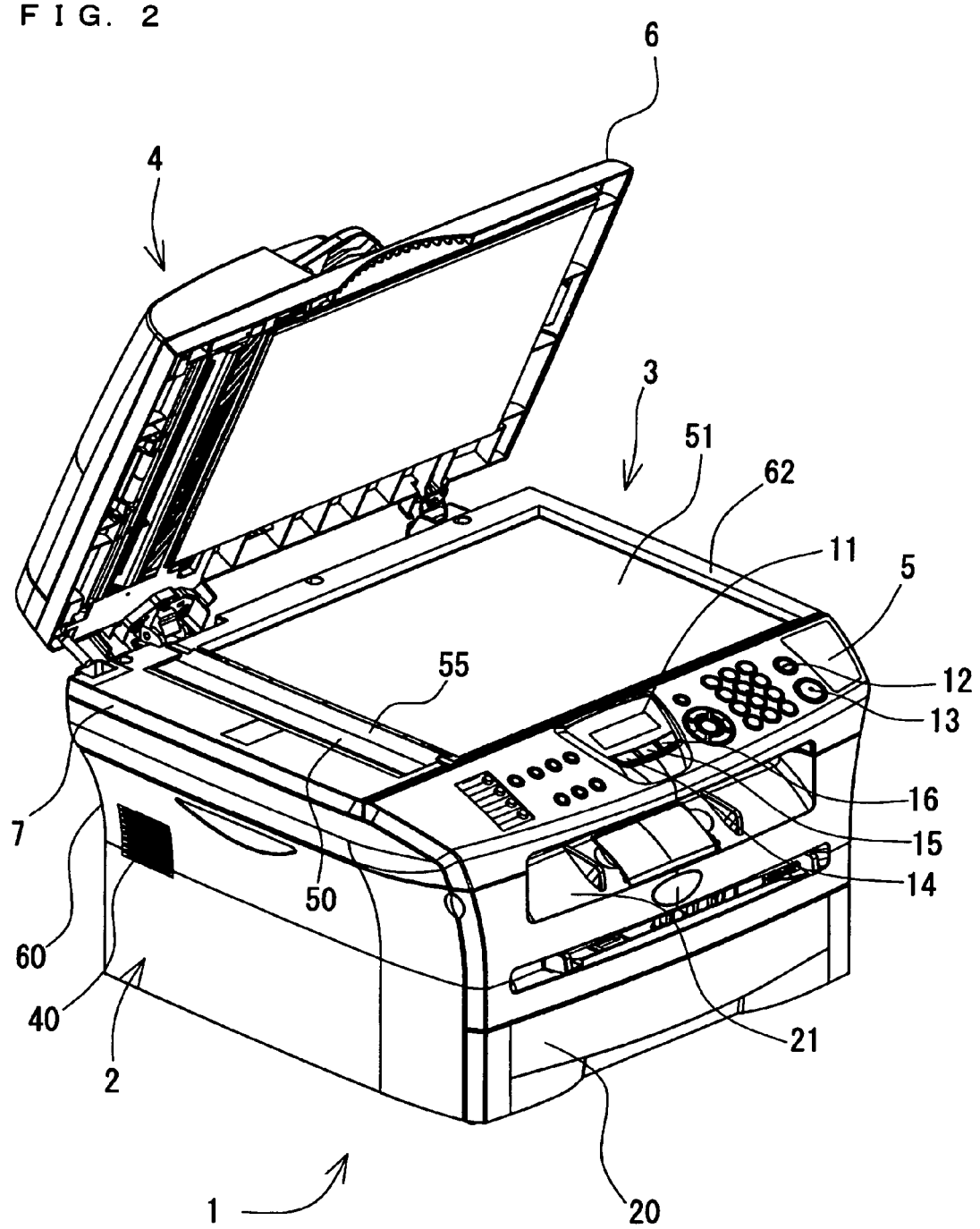
FIG. 2 is a schematic perspective view showing the outer configuration of the composite apparatus that is one example of the image processing apparatus according to the first embodiment of the present invention in which the document cover is open.

FIG. 1 and FIG. 2 are schematic perspective views showing an outer constitution of a composite apparatus 1 that is one example of an image processing apparatus according to the first embodiment of the present invention. In addition, FIG. 1 shows a state in which a document cover 6 is closed and FIG. 2 shows a state in which the document cover 6 is open.

As shown in FIG. 1 and FIG. 2, the composite apparatus 1 is a multi-function device (MFD) that integrally comprises a printer unit 2 (one example of an image forming unit) provided at a lower portion, a scanner unit 3 provided above the printer unit 2, a document cover 6 comprising an ADF (Automatic Document Feeder) 4, and an operation panel 5 arranged on the upper surface of the apparatus on the front side, so that the composite apparatus has a printer function, a scanner function, a copy function, a facsimile function and the like. Therefore, operation modes that the composite apparatus 1 can take include an operation mode corresponding to the above each function, that is, a printer mode, a scan mode, a copy mode, a facsimile transmitting mode, and a facsimile receiving mode. It is not necessary to say that the operation mode is defined according to the function of the composite apparatus 1, so that the modes are not limited to the above described modes. For example, a low-resolution reading mode and a high-resolution reading mode that will be described in a second embodiment below are the operation modes that the composite apparatus 1 can take.

The composite apparatus 1 is mainly connected to a computer (external information device) although the computer is not shown. The composite apparatus 1 records on a recording paper an image and/or a document in the printer unit 2 based on printing data including image data and/or document data transmitted from the computer. In addition, the composite apparatus 1 transfers the image data read by the scanner unit 3 to a storage device such as a hard disk drive (HDD) built in itself or the computer connected to itself. Furthermore, the composite apparatus 1 can record the image read by the scanner unit 3, in the printer unit 2 without transmitting or receiving data with the computer, that is, it can execute the copy function. The constitution of the composite apparatus 1 in the following description is only one example to embody the present invention, so that the constitution can be changed appropriately within the scope of the present invention.

The operation panel 5 to operate the printer unit 2 and the scanner unit 3 is provided on the front side of the upper surface of the composite apparatus 1, that is, on the upper surface of the front side of the scanner unit 3. The operation panel 5 comprises various kinds of buttons and a liquid crystal display 11. The composite apparatus 1 operates according to instructions inputted from the operation panel 5. The various kinds of buttons comprise a plurality of input keypads such as mode selecting buttons including a start button 12 to start the operation of the printer unit 2 and the scanner unit 3, a stop button 13 to terminate the operation or complete the setting, a FAX button 14 to select the facsimile function, a scanner button 15 to select the scanner function, a copy button 16 to select the copy function and the like, a dial button to input the number of copies or input reading resolution by the scanner unit 3 and the like, and other various kinds of setting buttons.

When a certain button in the operation panel 5 is pressed, a control unit 100 (refer to FIG. 7) of the composite apparatus 1 is given the input corresponding to the pressed button. For example, when the copy button 16 is pressed, the composite apparatus 1 is set in the copy mode in which the copy function is available. The present operation state of the composite apparatus 1 and an operation guide and the like for a user is displayed in the liquid crystal display 11. The composite apparatus 1 operates under the control of the control unit 100 (refer to FIG. 7) based on the input from the operation panel 5. As described above, when the composite apparatus 1 is connected to the computer, the composite apparatus 1 can operate based on the instruction transmitted from the computer through a printer driver, a scanner driver or the like.

As shown in FIG. 1 and FIG. 2, the scanner unit 3 comprises a document reading table 7 serving as an FBS (Flatbed Scanner). In the scanner unit 3, the document cover 6 is mounted on the document reading table 7 through a hinge provided on the back side so as to be closed or opened. The document reading table 7 comprises an approximately rectangular body frame 60, a platen glass 50 and a contact glass 51 (refer to FIG. 2) provided on the upper surface of the body frame 60, and an image reading unit 52 (refer to FIG. 3 and FIG. 4) built in the body frame 60. The body frame 60 constitutes a part of a case of the composite apparatus 1.

When the scanner unit 3 is used as the FBS, the document whose image is to be read out is set on the contact glass 51, and the contact glass 51 comprises a transparent and colorless glass plate, for example. When the document is placed on the contact glass 51 and the document cover 6 is closed, the document is fixed by the document cover 6. Under the contact glass 51, there is provided the image reading unit 52 (refer to FIG. 3 and FIG. 4) comprising a CIS unit 69 (refer to FIG. 3 and FIG. 4) that is an example of an image reading unit whose main scanning direction is set to the depth direction of the composite apparatus 1. The CIS unit 69 is constituted by a CIS image sensor, which can be moved in a sub-scanning direction (that is, the predetermined direction) that crosses the depth direction of the composite apparatus 1 at right angles.

The CIS unit 69 stands by at a home position (that is, a reference position) that is positioned an the lower position of the left end portion of the contact glass 51 at the time of non-reading operation. When the instruction of the image reading is inputted, the CIS unit 69 starts to move from the home position in the sub-scanning direction, and exposes and scans the document on the contact glass 51 in the sub-scanning direction. Thus, the image data of the document is read out. When the exposing and scanning operation of one sheet of entire document is completed, the CIS unit 69 returns to the home position. In addition, when the document is a photographic film for a silver salt film camera (a negative film or a positive film), the CIS unit 69 scans the document while the photographic film is exposed by an exposing device (not shown) provided on the back surface of the document cover 6. In this case, the CIS unit 69 does not expose the film.

The document cover 6 comprises the ADF 4 to sequentially feed the document from a document tray 53 to a paper discharge tray 54. The platen glass 50 is a long and flat glass plate elongated in the depth direction of the composite apparatus 1, and it is provided at the left end portion viewed from the front of the document reading table 7. While the document is being conveyed by the ADF 4, the document passes through the platen glass 50 and the CIS unit 69 standing by under the platen glass 50 reads the image from the document. Therefore, when the ADF 4 is used, the CIS unit 69 does not move. In other words, since the present invention is not employed when the ADF 4 is used, the ADF 4 and the platen glass 50 may not be provided.

A positioning member 55 is provided between the platen glass 50 and the contact glass 51. The positioning member 55 is a long and flat non-transparent plate member elongated in the depth direction of the composite apparatus 1 similar to the platen glass 50. The positioning member 55 is used as the positioning reference of the document when the document is placed on the contact glass 51 that is the document placing surface in the FBS. Therefore, its center position and both-end positions of document sizes such as A4 size, B5 size, and the like are marked on the upper surface of the positioning member 55. In addition, a guide surface to scoop the document passing on the platen glass 50 and return it to the ADF 4 during the conveyance by the ADF 4 is formed on the upper surface of the positioning member 55.

Figure 3:
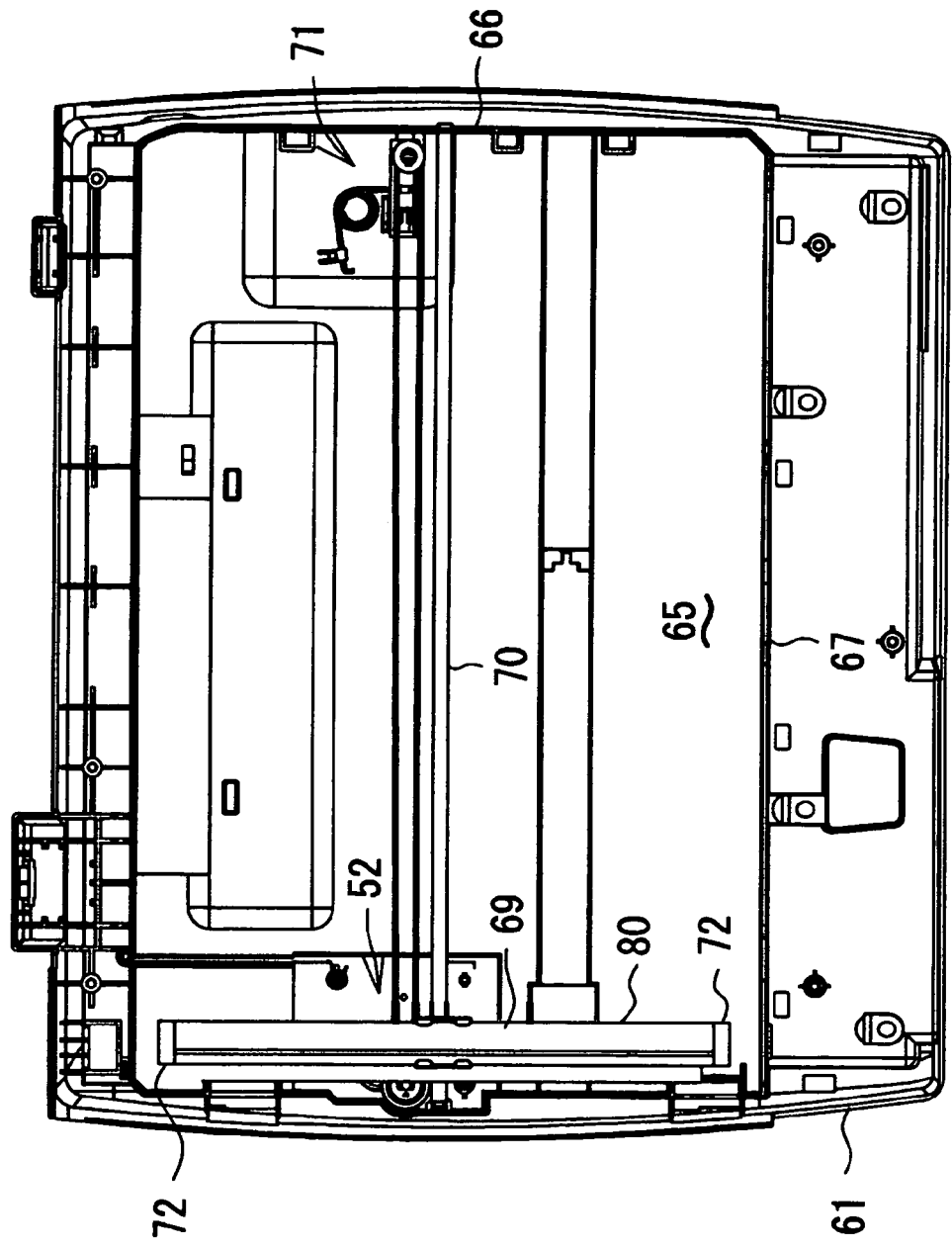
FIG. 3 is a plan view showing an inner structure of a document reading table of the composite apparatus that is one example of the image processing apparatus according to the first embodiment of the present invention.
Figure 4:
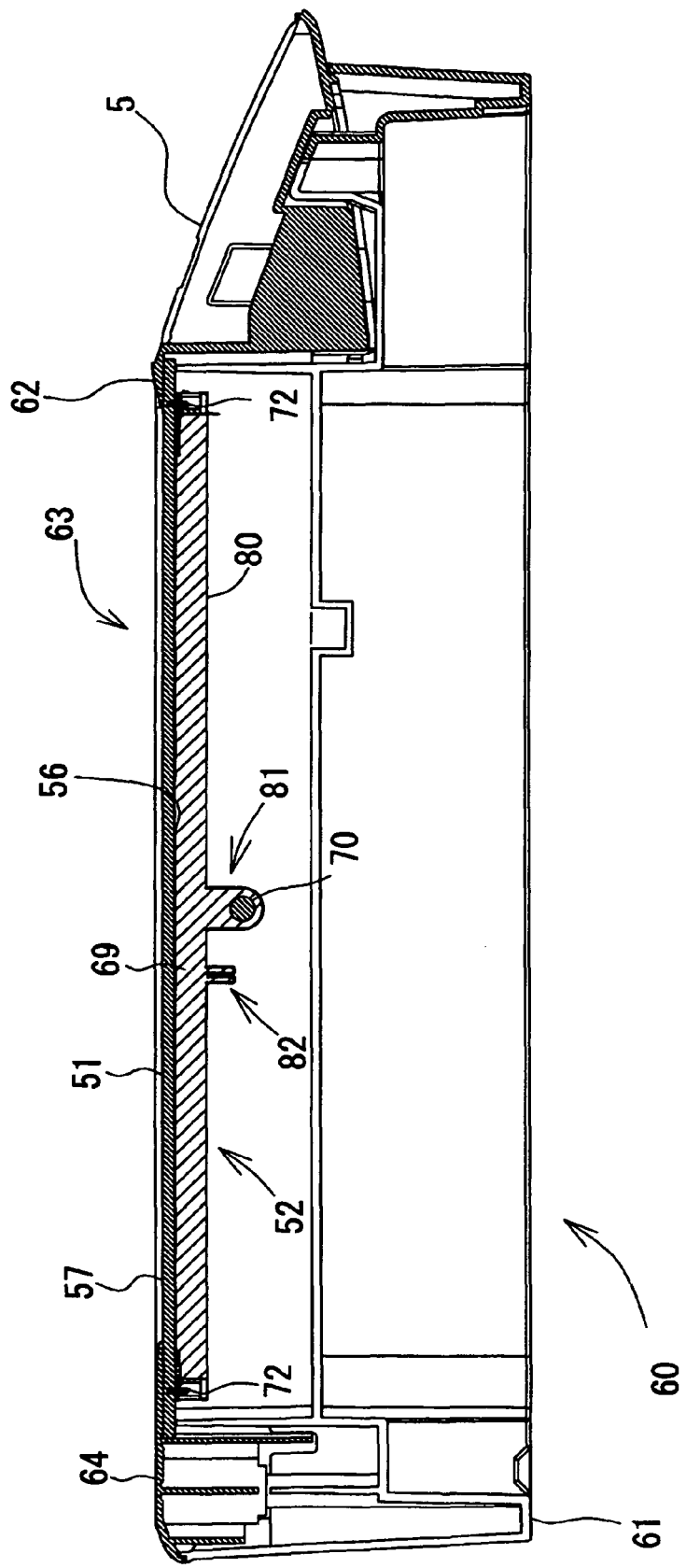
FIG. 4 is a sectional view showing a scanner cut in the depth direction of the composite apparatus that is one example of the image processing apparatus according to the first embodiment of the present invention.

FIG. 3 is a plan view showing the inner structure of the document reading table 7, and FIG. 4 is a sectional view of the scanner unit 3 cut along the depth direction of the composite apparatus 1. The platen glass 50 and the contact glass 51 are not illustrated in FIG. 3 for sake of simplification of the description. In addition, the sections of the document cover 6 and the printer unit 2 are not illustrated in FIG. 4.

As shown in FIG. 3 and FIG. 4, the body frame 60 comprises a box-shaped lower frame 61 whose upper surface is open, and an upper cover 64 having an opening 63 at an upper surface 62. By engaging the upper cover 64 with the lower frame 61, the body frame 60 is constituted. The contact glass 51 is mounted on the upper cover 64 so as to be exposed to the opening 63. A surface 57 of the contact glass 51 constitutes a document placing surface and the opening 63 defines the outer periphery of the document placing surface.

As shown in FIG. 3, the image reading unit 52 is arranged in the lower frame 61. Both lower frame 61 and the upper cover 64 are formed of a synthetic resin. The lower frame 61 comprises a base portion 65 constituting a bottom plate, a side wall 66 standing from the periphery of the base portion 65, and a partition plate 67, which are integrally formed. By the partition plate 67, a portion in which the image reading unit 52 is arranged and a portion in which a board of the operation panel 5 and the like are arranged are divided. A supporting rib to support the contact glass 51, a boss to screw the various kinds of members, a through hole for an electrical wiring and the like are provided in the lower frame 61. However, since the configuration, the size and the position of these are appropriately designed according to the usage of the document reading table 7, the detailed description of them is not given here.

As shown in FIG. 3, the image reading unit 52 comprises the CIS unit 69, and a belt driving mechanism 71 (one example of a driving unit) having a guide shaft 70. In addition, the image reading unit 52 comprises a roller unit 72. As shown in FIG. 4, the roller unit 72 is in contact with a back surface 56 of the contact glass 51, so that the sliding movement of the CIS unit 69 in the sub-scanning direction can be smooth. The CIS unit 69 is a contact type of image sensor. The CIS unit 69 irradiates the document with light and receives reflected light from the document to convert the received light to an electric signal. The CIS unit 69 comprises an elongated rectangular case 80, and the case 80 engages with the guide shaft 70 whose axial direction is the sub-scanning direction. The case 80 moves reciprocally in the sub-scanning direction below the contact glass 51 (refer to FIG. 2 and FIG. 4) together with the CIS unit 69. In addition, the image reading unit 52 is not limited to the above CIS unit 69. For example, a unit comprising a reduced optical CCD image sensor or a CMOS (Complementary Metal-Oxide Semiconductor) image sensor and the like may be used.

The guide shaft 70 is spanned over the width direction of the lower frame 61. Here, the "width direction of the lower frame 61" is the direction that crosses the longitudinal direction (that is, the main scanning direction) of the case 80 of the CIS unit 69, and it is along the back surface 56 of the contact glass 51. More specifically, it is a direction perpendicular to the paper surface in FIG. 4, that is, the sub-scanning direction. A bearing portion 81 is formed at lower portion of the case 80. By the bearing portion 81, the case 80 is born so as to be slidable with respect to the guide shaft 70 in the sub-scanning direction. The case 80 is driven by the belt driving mechanism 71 so as to move guided by the guide shaft 70. In addition, the guide shaft 70 is elastically forced upward by a coil spring (not shown) provided at a position in which the movement of the case 80 is not hindered. Therefore, the case 80 is forced to the back surface 56 of the contact glass 51 by the guide shaft 70 so as to be in contact with it, and it can move in the sub-scanning direction in a state it is pressed against the back surface 56 of the contact glass 51.

As shown in FIG. 4, the roller unit 72 is provided at both end portions of the CIS unit 69. The roller unit 72 comprises a roller rolling in the sub-scanning direction and this roller is in contact with the back surface 56 of the contact glass 51. Therefore, when the CIS unit 69 moves in the sub-scanning direction, the roller rolls on the back surface 56 of the contact glass 51 together with the movement. Since the roller unit 72 is provided, even when the CIS unit 69 is forced toward the back surface 56 of the contact glass 51, the CIS unit 69 can smoothly move along the contact glass 51.

Figure 5:
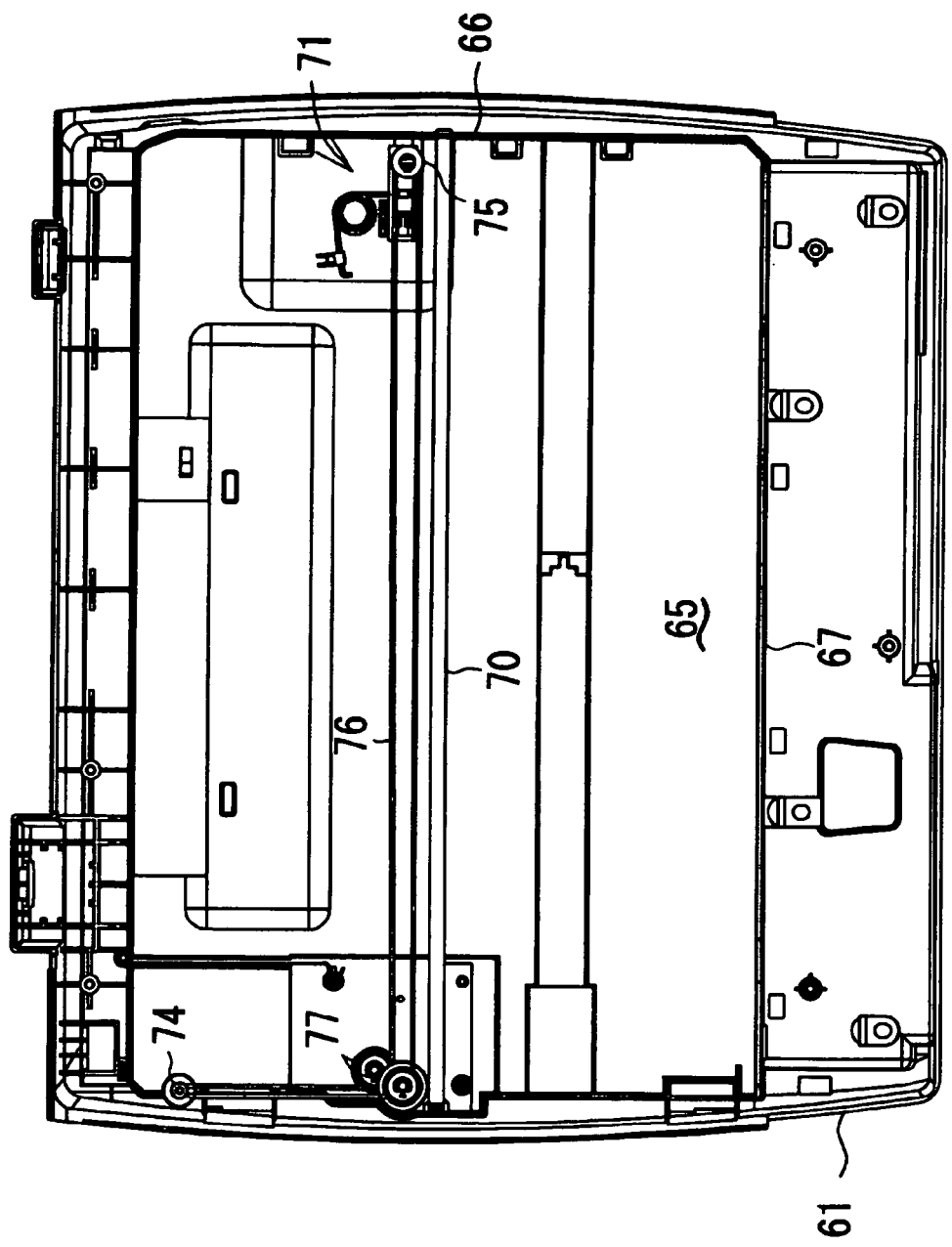
FIG. 5 is a plan view showing the document reading table to show a schematic constitution of a belt driving mechanism of the composite apparatus that is one example of the image processing apparatus according to the first embodiment of the present invention.

FIG. 5 is a plan view showing the document reading table 7 to show the schematic constitution of the belt driving mechanism 71. The CIS unit 69 is not illustrated in FIG. 5.

As shown in FIG. 5, the belt driving mechanism 71 comprises the guide shaft 70, a driving pulley 74, a driven pulley 75, a timing belt 76 is wound between them, and a carriage motor 78 (refer to FIG. 7) connected to the rotation shaft of the driving pulley 74. The timing belt 76 is an endless cogged belt in which tooth are formed inside. When the carriage motor 78 (refer to FIG. 7) rotates the driving pulley 74, the timing belt 76 moves around.

As shown in FIG. 5, the driving pulley 74 is arranged on the left back side of the lower frame 61. The timing belt 76 wound around the driving pulley 74 is extended toward the front side of the lower frame 61 and wound around a middle pulley 77 provided in front of the guide shaft 70. Furthermore, the timing belt 76 is bent at approximately right angles and extended to the right end of the lower frame 61 along the guide shaft 70 and wound around the driven pulley 75 provided in the vicinity of the right end portion of the lower frame 61. That is, the timing belt 76 is provided in approximately an L shape in plan view as shown in FIG. 5. The portion of the timing belt 76 from the driven pulley 75 to the middle pulley 77, that is, the portion along the guide shaft 70 is coupled with a coupling portion 82 (refer to FIG. 4) formed at the lower portion of the case 80. Thus, the timing belt 76 and the case 80 are coupled. In addition, as the timing belt 76, other than the above endless belt, a long belt having an end can be used. However, in this case, it is necessary to provide a winding roller that winding up both end portions of that belt so as to be fixed to the lower frame 61 and the like instead of the driving pulley 74 and the driven pulley 75.

Therefore, when the image data of the document is read out by the CIS unit 69, the CIS unit 69 is moved by sliding from the home position toward the sub-scanning direction by the belt driving mechanism 71, and the CIS unit 69 exposes the document during this sliding movement. More specifically, while the CIS unit 69 moves in the sub-scanning direction along the guide shaft 70, the document is irradiated with light from a light source such as an LED provided in the CIS unit 69, and its reflected light is received by a light receiving element. The light receiving element converts the received light to a predetermined electrical signal (image signal) and outputs it. When the scanning for one sheet of document is completed by the CIS unit 69, the belt driving mechanism 71 is reversely driven. Thus, the CIS unit 69 is moved by sliding along the guide shaft 70 to the home position at a predetermined return speed as will be described below.

Figure 6:
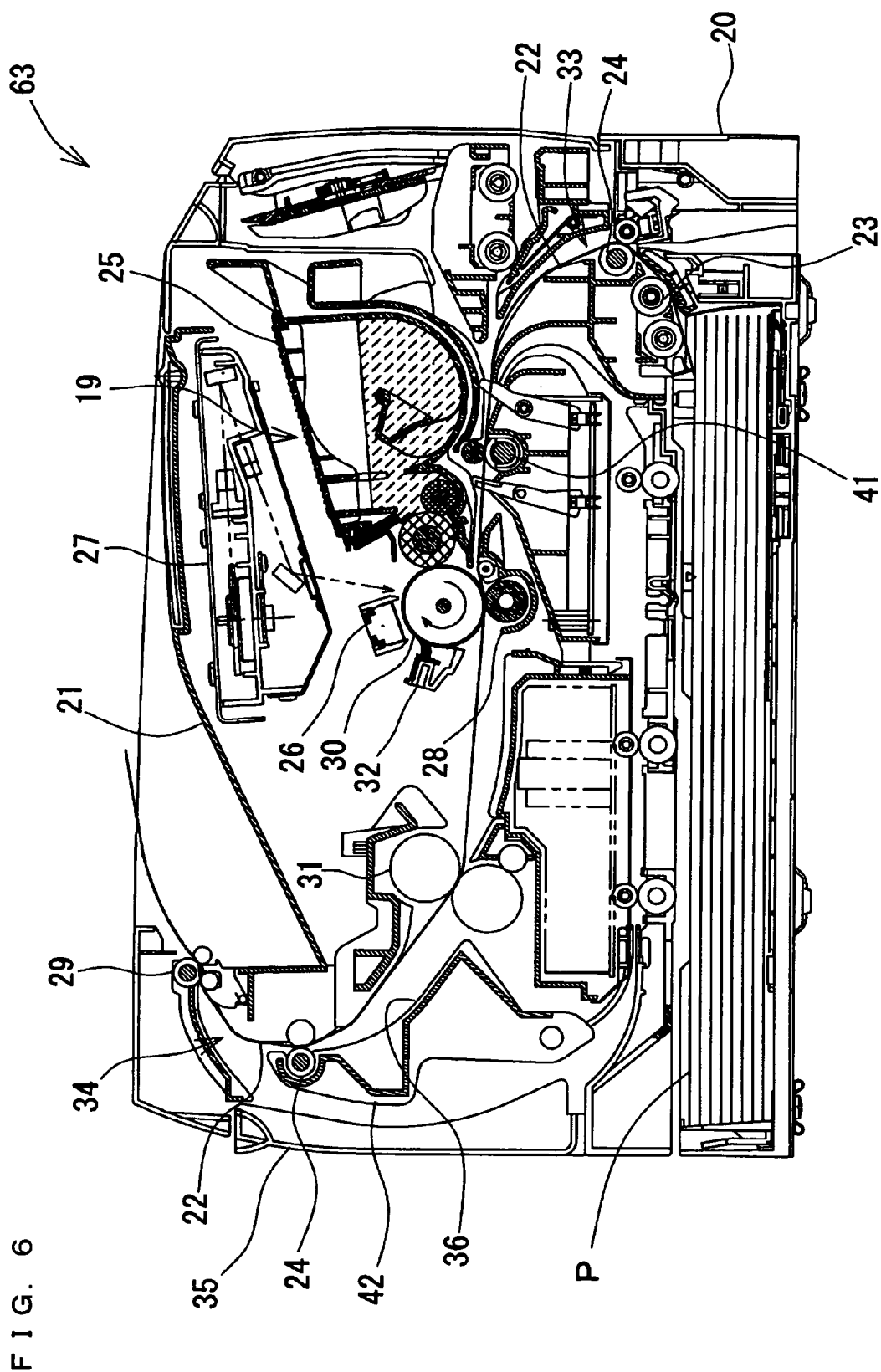
FIG. 6 is a schematic sectional view showing a section structure of a printer of the composite apparatus that is one example of the image processing apparatus according to the first embodiment of the present invention.

FIG. 6 is a schematic sectional view showing a sectional structure of the printer unit 2. The schematic constitution of the inside of the printer unit 2 will be briefly described with reference to FIG. 6. The right side in FIG. 6 is the front face of the composite apparatus 1.

The printer unit 2 carries out an image forming process by so called an electrophotographic method. The printer unit 2 schematically comprises a paper feeding cassette 20 provided at a lowermost portion, a paper discharging tray 21 provided on its front surface of the upper portion, a process unit 19, a laser scanning unit 27, and an approximately laterally-facing S-shaped conveyance path 22 extending from the front side of the feeding cassette 20 to the back side of the paper discharging tray 21 and a feeding roller 23, a resist roller 41, a transfer device 28, a fixing device 31, and discharging roller 29 sequentially arranged from the paper feeding cassette 20 along the conveyance path 22. A conveyance roller 24 is provided at an appropriate position along the path 22. As shown in FIG. 1, an exhaust outlet 40 is provided on the left side face of the printer unit 2. A cooling fan 38 (refer to FIG. 7) to cool a heating element such as the fixing device 31 and the motor by exhausting air warmed in the printer to the outside is appropriately provided inside the exhaust outlet 40.

The process unit 19 comprises a photoconductor drum 30 arranged so as to be opposed to the transfer device 28 across the conveyance path 22, and a conductive brush 32, a charging device 26, a developing unit 25 and the like that are sequentially arranged from the transfer device 28 side to the downstream side of the rotation direction of the photoconductive drum 30 around the photoconductive drum 30. Although the image forming process of the printer unit 2 employs the electrophotographic method in the first embodiment, the present invention is not limited to this. For example, an inkjet method or a thermal method may be used.

The transfer device 28 comprises a transfer roller, the developing unit 25 comprises a developing roller, and the fixing device 31 comprises a heating roller and a pressure roller. There rollers, the photoconductive drum 30, the paper feeding roller 23, the conveyance roller 24, and the discharging roller 29 are coupled with a main motor 37 (refer to FIG. 7) through a transferring mechanism for the driving force such as a plurality of gears and clutches. The main motor 37 and the cooling fan 38 are controlled by the control unit 100 (refer to FIG. 7).

An opening/closing door 35 is provided on the back side of the printer unit 2. Furthermore, an inner door 42 that turns around its lower fulcrum is provided inside the opening/closing door 35. A plurality of guide ribs 36 are arranged on the inner surface of the inner door 42. When the inner door 42 is closed, the guide ribs 36 constitute the outer surface of the conveyance path 22. When the inner door 42 is opened, the conveyance path 22 is opened. When the conveyance path 22 is opened, the discharging roller 29, the conveyance roller 24, the fixing device 28 and the like arranged along the conveyance path 22 are exposed. Thus, a maintenance operation can be easily performed.

According to the printer unit 2 constituted as described above, when the copy mode is set from the operation panel 5 and the start button 12 is pressed, the main motor 37 and the cooling fan 38 are driven. In addition, the charging device 26 charges the surface of the rotating photoconductive drum 30 at the predetermined potential (several hundreds V, for example). The image data read by the CIS unit 69 is transferred to the laser scanning unit 27. Then, the surface of the photoconductive drum 30 that has been charged at the predetermined potential is scanned by the laser scanning unit 27. Thus, an electrostatic latent image is formed on the photoconductive drum 30. When the electrostatic latent image is moved to the position opposed to the developing unit 25 by rotating the photoconductive drum 30, the electrostatic latent image is developed by moving a developer to the electrostatic latent image at the developing unit 25.

Although the main motor 37 and the cooling fan 38 are driven and stopped at the same time in the first embodiment, they may be controlled separately. For example, even after the image forming process has been completed, there is a case where it is necessary to continue to drive the cooling fan 38. In this case, as described above, it is preferable that the main motor 37 and the cooling fan 38 are controlled separately. The operation mode (fan operation mode) in which the cooling fan 38 is driven indispensably is one example of the operation mode of the composite apparatus 1.

In addition, at the transfer device 28, a recording paper conveyed from the paper feeding cassette 20 through a curved portion 33 of the conveyance path 22 so as to be conveyed from the lateral direction upward in the up and down direction is sandwiched between the photoconductive drum 30 and the transfer roller moving at the same speed as that of the photoconductive drum 30 and charged. Thus, the image on the surface of the photoconductive drum 30 is transferred to the recording paper.

After the image has been transferred by the transfer device 28, as the photoconductive drum 30 further rotates, a remaining developer on the photoconductive drum 30 is removed by the conductive brush 32 provided on the downstream side of the rotation direction of the transfer device 28 so as to rub the surface of the photoconductive drum 30.

The recording paper to which the image is transferred by the transfer device 8 is conveyed to the fixing device 31 provided on the downstream side of its conveyance direction and the developer is pressured and heated so as to be fused and fixed to the recording paper. Then, the recording paper is discharged to the paper discharge tray 21 by the discharging roller 29 through a curved portion 34. When the series of image forming process is completed, the control unit 100 stops the main motor 37 and the cooling fan 38.

Figure 7:
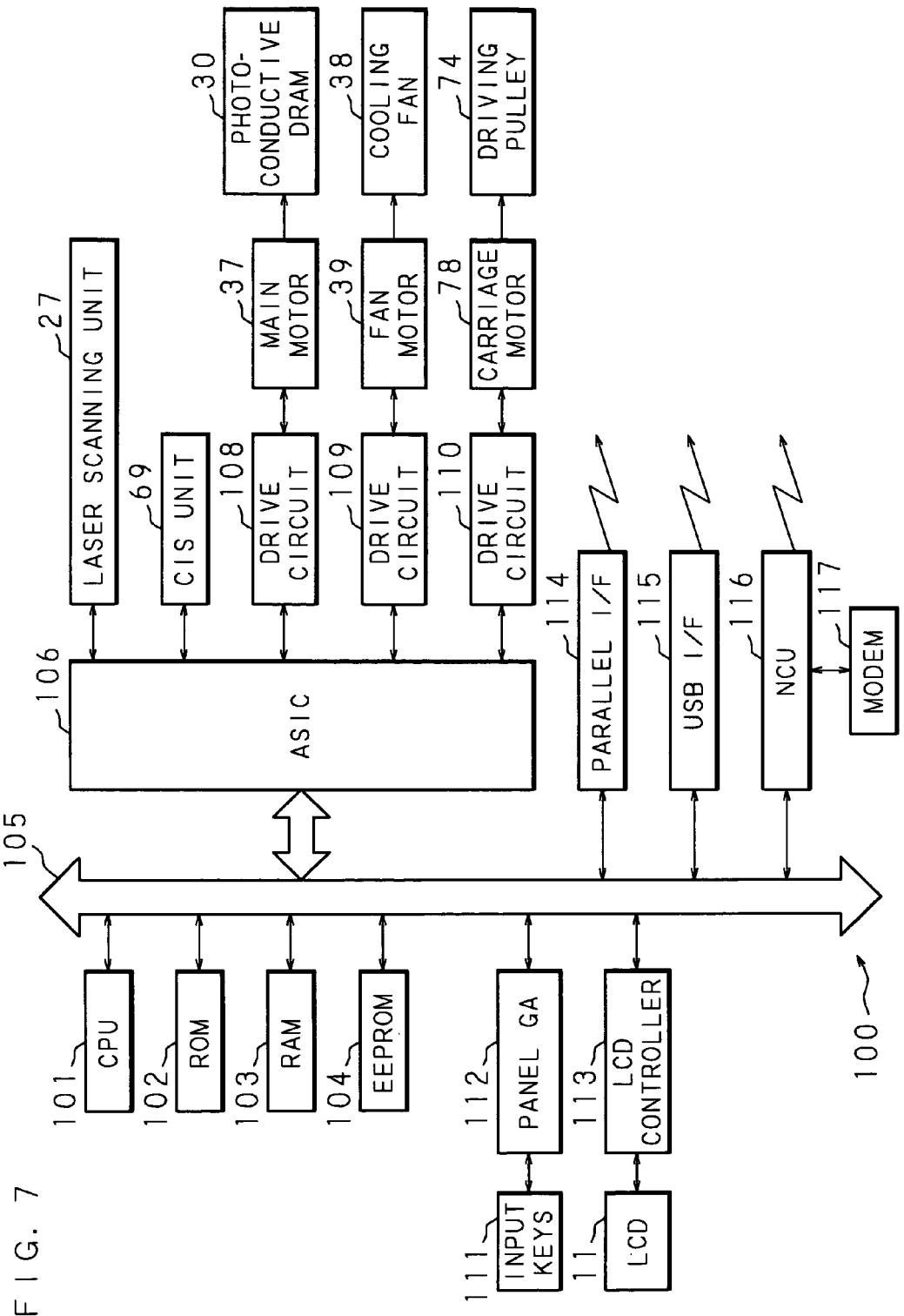
FIG. 7 is a block diagram showing a schematic structure of a control unit of the composite apparatus that is one example of the image processing apparatus according to the first embodiment of the present invention.

Next, the control unit 100 controlling the operations of the composite apparatus 1 will be described with reference to FIG. 7 hereinafter. FIG. 7 is a block diagram showing the schematic configuration of the control unit 100. The control unit 100, as shown in FIG. 7, is configured as a microcomputer whose main components are a CPU (Central Processing Unit) 101, a ROM (Read Only Memory) 102, a RAM (Random Access Memory) 103, an EEPROM (Electrically Erasable and Programmable ROM) 104 and the like. In addition, the control unit 100 is connected to an ASIC (Application Specific Integrated Circuit) 106 through a bus 105.

The CPU 101 controls overall the peripheral control devices constituting the control unit 100 or the devices controlled by the control unit 100. According to the first embodiment, the CPU 101 reads and operates the data and the program stored in the ROM 102, the RAM 103, the EEPROM 104 and the like. When the CPU 101 controls the carriage motor 78 through the ADIC 106 and the drive circuit 110, the return speed of the CIS unit 69 is controlled. The controlling procedure regarding the return speed of the CIS unit 69 will be described below. In addition, the CPU 101 functions as a mode setting unit, a mode judging unit, and a return speed setting unit.

The program and the like for controlling each operation of the composite apparatus 1 are stored in the ROM 102. The RAM 103 is used as a storage region or an operation region in which the various kinds of data to be used when the CPU 101 executes the program is temporally stored.

A plurality of pieces of speed information regarding the return speed of the CIS unit 69 is stored in the EEPROM 104 as a database. More specifically, a plurality of return speeds predetermined according to the plurality of operation modes of the composite apparatus 1 are stored so as to correspond to each operation mode. For example, as shown in Table 1, a speed $V_O$ (that is, one of the specified speeds) is stored as a return speed corresponding to the scanner mode and the facsimile mode, and a speed $V_C$ (that is, one of the specified speeds) is stored as the return speed corresponding to the copy mode. Table 1 shows that when the operation mode of the composite apparatus 1 is in the scanner mode or the facsimile mode, the return speed is set to the speed $V_O$, and when it is in the copy mode, the return speed is set to the speed $V_C$. Thus, the database comprising the plurality of speeds (the speed $V_O$ and the speed $V_C$, for example) stored in the EEPROM 104 correspond to a specified speed group.

TABLE 1

| Operation mode | Return speed |
| --- | --- |
| Scanner mode, FAX mode | $V_O$ |
| Copy mode | $V_C$ |

According to the first embodiment, it is determined that the speed $V_O$ and the speed $V_C$ satisfies the relation that $V_O<V_C$. That is, the CIS unit 69 returns faster in the copy mode than in the scanner mode. Therefore, the speed $V_C$ corresponds to a first return speed and the speed $V_O$ corresponds to a second return speed. In the composite apparatus 1, the corresponding return speed is appropriately selected from the EEPROM 104 according to the operation mode of the composite apparatus 1 and set by the CPU 101. In addition, it is preferable that the information stored in the EEPRO 104 can be freely changed by a user by accessing from the operation panel 5 and the like. In addition, to simplify the description, it is assumed that the scanning speed when the CIS unit 69 moves from the home position in the sub-scanning direction is constant in the following embodiment.

Drive circuits 108, 109 and 110 are connected to the ASIC 106. The ASIC 106 generates a phase excitation signal to be transmitted to the main motor 37 for the printer unit 2, the fan motor 39 driving the cooling fan 38 and the carriage motor 78 for the scanner unit 3 according to the instruction from the CPU 101, and applies the generated signal to the drive circuits 108, 109 and 110 of the main motor 37, the fan motor 39, and the carriage motor 78, respectively. When the main motor 37, the fan motor 39 and the carriage motor 78 receive the drive signal through the drive circuits 108, 109 and 110, respectively, the rotation of each motor is controlled. In addition, the drive circuit 110 that controls the rotation of the carriage motor 78 and the ASIC 106 that generates the phase excitation signal and the like and applies it to the drive circuit 110 function as a drive control unit. In addition, according to the first embodiment, a description is made for a case where the drive circuit 110 and the ASIC 106 comprising hard logical circuits are provided as the drive control unit. However, the rotation control of the carriage motor 78 may be performed by the CPU 101 according to the procedure based on the software program, for example.

The drive circuit 108 drives the main motor 37 connected to the driving components such as the conveyance roller 24 and the discharging roller 29, as well as the photoconductive drum 30 of the printer unit 2. The drive circuit 108 receives the output signal from the ASIC 106 and generates the electric signal to rotate the main motor 37. When the main motor 37 rotates by receiving the electric signal to rotate, the rotation force of the main motor 37 is transmitted to the above-described driving components through a belt driving mechanism comprising the gear and belt and the like. As a result, the whole printer unit 2 is driven. Thus, the conveyance of the paper from the paper feeding cassette 20, the image forming process, the fixing of the developer by the fixing device 31 and the discharge of the recording paper can be performed.

The drive circuit 109 drives the fan motor 39 to drive the cooling fan 38. More specifically, as the drive circuit 109 receives the output signal generated by the ASIC 106 based on the drive control procedures outputted from the CPU 101, and it controls the fan motor 39.

The drive circuit 110 drives the carriage motor 78 connected to the driving pulley 74 of the scanner unit 3. More specifically, the drive circuit 110 receives the output signal from the ASIC 106, and it generates an electric signal to rotate the carriage motor 78. When the carriage motor 78 receives the electric signal and rotates, the rotation force of the carriage motor 78 is transmitted form the rotation shaft of the driving pulley 74 to the driving pulley 74. As a result, the driving pulley 74 rotates.

To the ASIC 106, the CIS unit 69 constituting the image reading unit 52 is connected. The ASIC 106 applies an electric signal to emit the light from the light source and a timing signal to output image data from a photoelectric conversion element, to the CIS unit 69 based on the instruction from the CPU 101. When the CIS unit 69 receives these signals, it irradiates the document with light at a predetermined timing and converts its reflected light to image data by the photoelectric conversion element and outputs it.

In addition, to the ASIC 106, the laser scanning unit 27 is connected. The image data outputted from the CIS unit 69 is transmitted to the laser scanning unit 27 through the ASIC 106 based on the transfer signal from the CPU 101. The laser scanning unit 27 generates a laser beam corresponding to the image data and exposes and scans the surface of the photoconductive drum 30 with the generated laser beam.

To the bus 105, a panel gate array (panel GA) 112 to control various input keys 111 such as the start button 12 and the stop button 13 provided in the operation panel 5 of the composite apparatus 1 are connected. The panel gate array 112 outputs a predetermined code signal when it detects that an input key 111 is pressed. A key code is assigned to each input key 111. The CPU 101 receives the code signal showing the predetermined key code from the panel gate array 112, and executes a control process according to a predetermined key process table. The key process table is formed by relating the key code to the control process, which is stored in the ROM 102, for example.

In addition, to the bus 105, an LCD controller 113 to control screen display of the liquid crystal display 11 is connected. The LCD controller 113 displays the information regarding the operation of the printer unit 2 or the scanner unit 3 and error information and the like on the screen of the liquid crystal display 11 based on the instruction from the CPU 101.

In addition, to the bus 105, a parallel interface 114 and a USB interface 115 to exchange data with the computer (not shown) through a parallel cable and a USB cable, respectively are connected. Furthermore, to the bust 105, a NCU (Network Control Unit) 116 and a modem 117 to implement the facsimile function are connected.

A description will be made of a mode setting process, a mode judging process and a return speed setting process in the first embodiment to be executed by the CPU 101 of the control unit 100 with reference to the flowchart shown in FIG.

Figure 8:
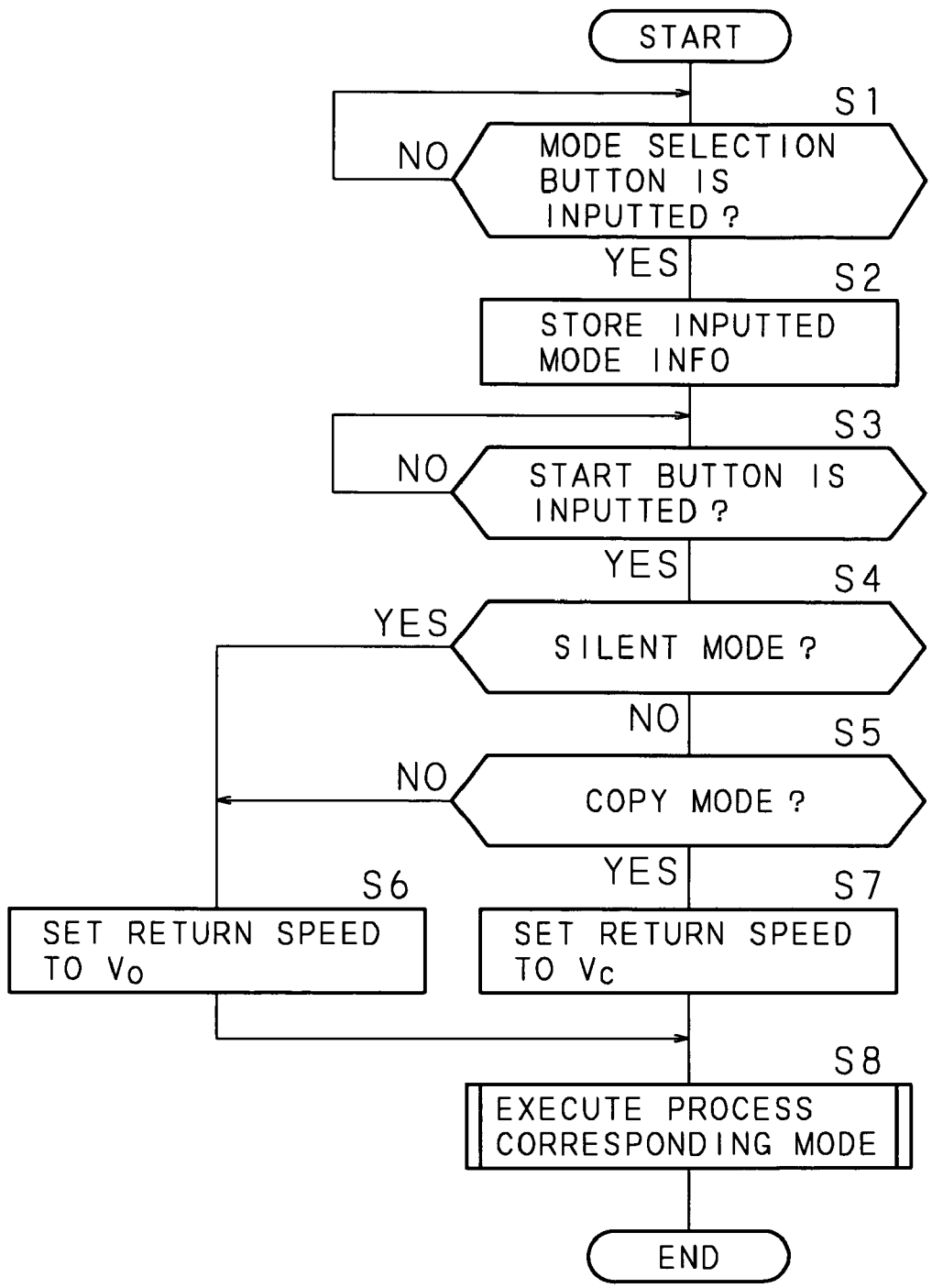
FIG. 8 is a flowchart to describe steps of a mode setting process, a mode judging process and a return speed setting process according to a first embodiment of a composite apparatus that is one example of the image processing apparatus according to the first embodiment of the present invention.

8 hereinafter. Reference numerals S1, S2 and the like in FIG. 8 denote the number of process steps. The process is started from a step S1.

First, at step S1, it is judged whether the mode selection button to set the operation mode of the composite apparatus 1 is inputted or not. This judgment is made such that the CPU 101 observes whether the code signal is transferred to the bus 105 from the panel gate array 112 or not, in response to the press of the mode selection button of the FAX button 14, the scanner button 15 or the copy button 16. This judgment process at the step S1 is continued until any mode selection button is pressed (NO at S1). In addition, according to the first embodiment, the description is made of the processing steps under the condition that any mode selection button is pressed. However, in a case where one operation mode (scanner mode, for example) is set as a default mode, even when the mode selection button is not pressed, the steps S1 and S2 are skipped and the process may be started from step S3.

When it is judged that the mode selection button is inputted (YES at S1), the inputted mode information is then stored in a predetermined memory region by the CPU 101 (S2). For example, when the scanner button 15 is pressed, the key code corresponding to the scanner button 15 is stored in the predetermined memory region. In this case, the key code corresponds to the mode information. Then, referring to the key code stored in the memory region, the CPU 101 sets how the composite apparatus 1 operates. Therefore, when the scanner button 15 is pressed as described above, it is judged that the scanner mode has been set and the CPU 101 executes the process according to the corresponding control program to make the composite apparatus 1 execute the scanner function. The above predetermined memory region is reserved in the resist of the RAM 103 or the CPU 101, for example. As describe above, the CPU 101 that stores the inputted mode information in the predetermined memory region and then sets the operation mode of the composite apparatus 1 functions as the mode setting unit.

Then, at step S3, it is judged whether the start button 12 is inputted or not. More specifically, this judgment is made such that the CPU 101 observes whether the corresponding code signal is transferred from the panel gate array 112 to the bus 105 or not, in response to the press of the start button 12 by the user. This judgment process is continued until the start button 12 is inputted (NO at S3). In addition, when the start button 12 is inputted while the mode selection button is not inputted yet, warning for urging the user to designate the mode is displayed in the liquid crystal display 11, for example. In addition, when the standard operation mode has been previously judged and the start button 12 is inputted while there is no input of the mode selection button, the composite apparatus 1 may be automatically set to the standard operation mode.

When the start button 12 is inputted (YES at S3), it is judged whether the composite apparatus 1 is in a silent mode or not at step S4. The silent mode is a mode to reduce a noise generated when the predetermined process is carried out in the operation mode (facsimile mode, scanner mode or copy mode) set in the composite apparatus 1. As one example of the silent mode, a process for automatically reducing the rotation speed of the carriage motor 78 and the main motor 37 at a predetermined time (at night, for example) is executed. As a concrete method for judging the silent mode, there is a method for turning a predetermined bit flag on or off at the predetermined time, for example. In addition, although the silent mode functions when the composite apparatus 1 has a silent function, the silent function itself is the well-known function. Therefore, the silent mode will not be described any more here.

When it is judged that the composite apparatus 1 is in the silent mode (YES at S4), the process proceeds to step S6. At step S6, the CPU 101 sets the return speed to $V_O$ (S6). The term "setting" as used herein means that the information showing the return speed $V_O$ is stored in the predetermined memory region reserved in the resist of the RAM 103 or the CPU 101. The CPU 101 refers to above mentioned memory region and transmits the information showing the return speed $V_O$ to the ASIC 106. When the ASIC 106 receives this information, it generates the phase excitation signal corresponding to the return speed $V_O$ and outputs it to the drive circuit 110.

Meanwhile, it is judged that the composite apparatus 1 is not in the silent mode (NO at S4), the process proceeds to step S5. At step S5, the CPU 101 judges whether the operation mode of the composite apparatus 1 is the copy mode or not. This judgment process is executed such that it is judged whether the mode selection button is pressed by the user or not based on the code signal transferred to the bus when what mode selection button is pressed. Here, when it is judged that the composite apparatus 1 is not in the copy mode (NO at S5), the process proceeds to step S6 and the CPU 101 set the return speed to $V_O$ (S6). More specifically, the CPU 101 refers to the table data shown in Table 1 stored in the EEPROM 104, and selects the return speed corresponding to the operation mode set at that time. For example, when the scanner mode or the facsimile mode is set, the speed $V_O$ is selected. Thus, similar to the above process at S6, the return speed is set to $V_O$.

At step S5, when it is judged that the operation mode of the composite apparatus 1 is the copy mode (YES at S5), the CPU 101 sets the return speed to $V_C$ (S7). In step S5, when it is judged that the operation mode of the composite apparatus is not the copy mode, (NO at S5), the CPU 101 sets the return speed to Vo (S6). Thus, the CPU 101 executes the judgment processes at steps S4 and S5, whereby the mode judging unit is concretely implemented. In addition, the CPU 101 executes the setting processes at the steps S6 and S7, wherein the return speed setting unit is concretely implemented.

When the setting processes at the steps S6 and S7 are completed, the process corresponding to the operation mode set by the user is executed (S8). For example, when the copy mode is set, the image reading process in which the image of the document is read out, and the image forming process in which an image is formed based on the read image data are executed. At this time, since the information showing the return speed $V_C$ is transferred to the ASIC 106 by the CPU 101, the CIS unit 69 is controlled so as to return at the return speed $V_C$. In addition, when the scanner mode is set, the image reading process in which the image of the document is read and the read image data is transferred to the predetermined storage device. At this time, since the CPU 101 transfers the information showing the return speed $V_C$ to the ASIC 106, the CIS unit 69 is controlled so as to return at the speed $V_O$ that is lower than the return speed $V_C$. According to the first embodiment, when the operation mode of the composite apparatus 1 is other than the copy mode, the CIS unit 69 is controlled so as to return at the speed $V_O$.

In addition, even when it is judged that the operation mode is not the copy mode at the step S5, in the case where it is judged that the operation mode of the composite apparatus 1 is the above-described fan operation mode, the CPU 101 may execute the process at step 7 to set the return speed to the speed $V_C$ that is higher than the speed $V_O$.

Thus, according to the first embodiment, when the operation mode of the composite apparatus 1 is the copy mode, since the CIS unit 69 returns at the speed $V_C$ higher than the speed $V_O$, a waiting time until the next document reading process can be reduced. However, while the image forming process is executed in the copy mode, the noise of the main motor 37 and the cooling fan 38 is relatively loud. Therefore, even when the CIS unit 69 returns at the speed $V_C$ higher than the speed $V_O$, a machine sound generated at that time does not become the noise because it is covered by the driving sound of the main motor 37 and the cooling fan 38.

Second Embodiment

A second embodiment of the present invention will be described hereinafter. According to the above first embodiment, the scanning speed when the CIS unit 69 moves from the home position in the sub-scanning direction is constant. However, according to the second embodiment, the composite apparatus 1 is used as a FBS (Flatbed Scanner) and when the scanning speed is different with respect to each image reading process, the return speed of the CIS unit 69 is set according to the scanning speed, which is different from the first embodiment.

The composite apparatus 1 according to the second embodiment is a multifunction device integrally comprising a printer unit 2, a scanner unit 3, a document cover 6, and an operation panel 5, whose constitution is basically the same as that of the first embodiment. Therefore, the same reference numerals are given to the same components as those described in the first embodiment and their detailed description will be omitted. In addition, the second embodiment can be applied to not only the composite apparatus 1 comprising a plurality of functions, but also to an apparatus having a single function, that is, a specialized apparatus such as a flatbed scanner having only a scanner function.

Although described in the first embodiment, the composite apparatus 1 has a low-resolution reading mode (one example of the first scanning mode) in which the reading resolution of the CIS unit 69 is lowered to read the image data of the document and a high-resolution reading mode (one example of the second scanning mode) in which the reading resolution thereof is raised to read the image data of the document, in the scanner mode, in addition to a printer function, a copy function and a facsimile function. The low-resolution reading mode and the high-resolution reading mode are judged based on a set value of the reading resolution set by the user through the operation panel 5. According to the second embodiment, as shown in the left column in Table 2, when it is assumed that the reading resolution of the CIS unit 69 can be set into 5 stages such as 100 dpi, 200 dpi, 300 dpi, 400 dpi and 600 dpi, the mode is judged as the low-resolution reading mode when the reading resolution is set to 300 dpi or less, and the mode is judged as the high-resolution reading mode when the reading resolution is set to 400 dpi or more. This judgment can be made by storing threshold value information regarding the resolution in an EEPROM 104 and comparing the threshold value information with the set resolution. In addition, it is preferable that the threshold value information can be freely changed by the operation of the user through the operation panel 5.

TABLE 2

| Reading resolution | Mode |
|---|---|
| 100 dpi | Low-resolution reading mode |
| 200 dpi | (scanning speed: $V_H$) |
| 300 dpi | |
| 400 dpi | High-resolution reading mode |
| 600 dpi | (scanning speed: $V_L$) |

In addition, according to the second embodiment, based on a obvious fact that the lower the resolution is, the more the process load is reduced, so that the scanning speed can be increased, but meanwhile, since the higher the resolution is, the more the resolution is increased, so that it is necessary to slow down the scanning speed, the scanning speed in the low-resolution reading mode is set to $V_H$ (corresponding to the predetermined scanning speed) and the scanning speed in the high-resolution reading mode is set to $V_L$ slower than the speed $V_H$ (refer to Table 2). In addition, between the case of a color reading process and the case of a monochrome reading process, even when their reading resolutions are the same, the load of the reading process is greater in the color reading process. Therefore, it is preferable that the table data shown in Table 2 is prepared for color reading and monochrome reading, respectively.

As shown in Table 3, in the EEPROM 104 of a control unit 100, a speed $V_C$ (that is, one of the specified speeds) that is the first return speed is stored as a return speed corresponding to the low-resolution reading mode, and a speed $V_O$ (that is, one of the specified speeds) that is the second return speed is stored as a return speed corresponding to the high-resolution reading mode. In addition, Table 3 shown that the set return speed when the operation mode of the composite apparatus 1 is the low-resolution reading mode is the speed $V_C$, and the set return speed when the operation mode thereof is the high-resolution reading mode is the speed $V_O$. Thus, the database including the plurality of speeds (the speeds $V_O$ and $V_C$, for example) stored in the EEPROM 104 corresponds to the specified speed group.

TABLE 3

| Operation mode | Return speed |
|---|---|
| Low-resolution reading mode (scanning speed: $V_H$) | $V_C$ |
| High-resolution reading mode (scanning speed: $V_L$) | $V_O$ |

A description will be made of a mode setting process, a mode judging process, and a return speed setting process in the second embodiment that are executed by a CPU 101 of the control unit 100 with reference to the flowchart shown in FIG. 9. The process is started from step S11.

First, at step S11, based on a code signal transferred from a panel gate array 112 to a bus 105 in response to the press of a scanner button 15 by the user, it is judged whether the scanner mode is set or not by the CPU 101. This judgment process is continued until any mode selection button is inputted.

When it is judged that the scanner mode is set (YES at S11), it is judged whether any resolution is inputted from the operation panel 5 or not (S12). In addition, the resolution is inputted such that the user inputs a numeric value using a ten-key keypad or the user selects the desired resolution from the plurality of previously registered resolutions using an arrow key and the like. When it is judged that the resolution is inputted (YES at S12), the inputted resolution is set as the reading resolution that is actually read out by the CIS unit 69 (S13). At this time, when the inputted resolution is not more than 300 dpi, the CPU 101 sets the operation mode of the composite apparatus 1 to the low-resolution reading mode and when it is not less than 400 dpi, the CPU 101 sets the operation mode of the composite apparatus 1 to the high-resolution reading mode. Thus, by executing process to set the operation mode of the composite apparatus 1 to the low-resolution reading mode or the high-resolution reading mode, the CPU 101 functions as a mode setting unit. The information of the set mode is temporally stored in a RAM 103. In addition, the information regarding the set resolution is transferred to the ASIC 106 by the CPU 101. The ASIC 106 controls the CIS unit 69 such that the CIS unit 69 executes the reading process at the set reading resolution.

Then, at step S14, it is judged whether the start instruction of the image reading is inputted or not (S14). This judgment is made by judging whether a start button 12 is inputted or not. This judgment process is continued until the start button 12 is inputted. In addition, when the start button 12 is inputted while the resolution is not inputted, a warning to notify the user that the resolution is not set yet is displayed in a liquid crystal display 11, for example. When the standard reading resolution is previously set and the start button 12 is inputted while the resolution is not inputted, the standard reading resolution may be automatically set.

Then, it is judged whether the composite apparatus 1 is in a silent mode or not at step S15. Here, when it is judged that the silent mode is set (YES at S15), the process proceeds to step S17 and the CPU 101 sets the return speed to $V_O$ (S17).

Meanwhile, when it is judged that the silent mode is not set at the step S15 (NO at S15), the process proceeds to step S16. At the step S16, the CPU 101 judges whether the operation mode of the composite apparatus 1 is the low-resolution reading mode or not. This judgment process is executed such that the CPU 101 refers to the mode information temporally stored in the RAM 103. Here, when it is judged that the mode is not the low-resolution reading mode (NO a S16), the process proceeds to step S17 and the CPU 101 sets the return speed to the speed $V_O$ (S17). More specifically, the CPU 101 refers to the table data shown in Table 3 stored in the EEPROM 104 and selects the return speed corresponding to the operation mode being set at that time. At this step S17, the speed $V_O$ corresponding to the high-resolution reading mode is selected. Then, similar to the above setting process at the step S17, the return speed is set to the speed $V_O$.

When it is judged that the operation mode of the composite apparatus 1 is the low-resolution reading mode at the step S16 (YES at S16), the CPU 101 sets the return speed to $V_C$ (S18). Thus, when the CPU 101 executes the judgment processes at steps 15 and 16, a mode judging unit is concretely implemented. In addition, when the CPU 101 executes the setting processes at the steps S17 and S18, a return speed setting unit is concretely implemented.

When the setting process at the step S17 or the step S18 is completed, the CPU 101 executes a process corresponding to the scanner mode, that is, an image reading process (S19). At this time, when the operation mode of the composite apparatus 1 is the low-resolution reading mode, the CPU 101 transfers the information showing the scanning speed $V_H$ and the information showing the return speed $V_C$ to the ASIC 106. Thus, the CIS unit 69 is controlled such that it scans at the scanning speed $V_H$, and it returns at the return speed $V_C$ after completion of the scanning. In addition, when the high-resolution reading mode is set, the CPU 101 transfers the information showing the scanning speed $V_L$ ($<V_H$) and the information showing the return speed $V_O$ to the ASIC 106. Thus, the CIS unit 69 is controlled such that it scans at the scanning speed $V_L$ lower than the scanning speed $V_H$ and it returns at the speed $V_O$ lower than the return speed $V_C$ after completion of the scanning.

Thus, according to the second embodiment, when the operation mode of the composite apparatus 1 is the low-resolution reading mode, the CIS unit 69 returns at the speed $V_C$ higher than the speed $V_O$, so that the waiting time until the next document reading process can be shortened. In addition, in this case, since the scanning speed is high, even when the return speed is increased, a machine sound generated before and after completion of the scanning is not changed. Therefore, the user does not feel uncomfortable because of the noise. When the operation mode of the composite apparatus 1 is the high-resolution reading mode, the CIS unit 69 returns at the speed $V_O$ lower than the speed $V_C$. However, the scanning speed is slow in the high-resolution reading mode. Therefore, since the machine sound generated before and after completion of the scanning can be equalized by reducing the return speed, the user does not feel uncomfortable.

In addition, although the description has been made of the case where the composite apparatus 1 is set in the scanner mode in the second embodiment, the present invention can be applied to a case where the composite apparatus 1 is set in the facsimile transmission mode and the like. In addition, the description has been made of the example in which the scanning speed is set to the speed $V_H$ in the low-resolution reading mode and the scanning speed is set to the speed $V_L$ in the high-resolution reading mode in the second embodiment. However, the present invention can be applied to a case where a scanning mode in which the CIS unit 69 is moved at the speed $V_H$ for scanning (first scanning mode), or a scanning mode in which the CIS unit 69 is moved at the speed $V_L$ for scanning (second scanning mode) is set regardless of the resolution mode.

Third Embodiment

According to the second embodiment, as shown in Table 2, the low-resolution reading mode is set at 300 dpi or less and the high-resolution reading mode is set at 400 dpi or more and the scanning speed is differentiated according to the mode. However, according to a third embodiment, as shown in Table 4, the scanning speed is determined according to each resolution and the return speed is determined according to each resolution. Here, the scanning speeds shown in the middle column in Table 4 have the relation such that $V_1 > V_2 > V_3 > V_4 > V_6$. In addition, the return speeds shown in the right column in Table 4 has the relation such that $V_{100} > V_{200} > V_{300} > V_{400} > V_{600}$. The information shown in Table 4 is stored in an EEPROM 104 as table data.

TABLE 4

| Reading resolution | Scanning speed | Return speed |
| --- | --- | --- |
| 100 dpi | $V_1$ | $V_{100}$ |
| 200 dpi | $V_2$ | $V_{200}$ |
| 300 dpi | $V_3$ | $V_{300}$ |
| 400 dpi | $V_4$ | $V_{400}$ |
| 600 dpi | $V_6$ | $V_{600}$ |

Figure 9:
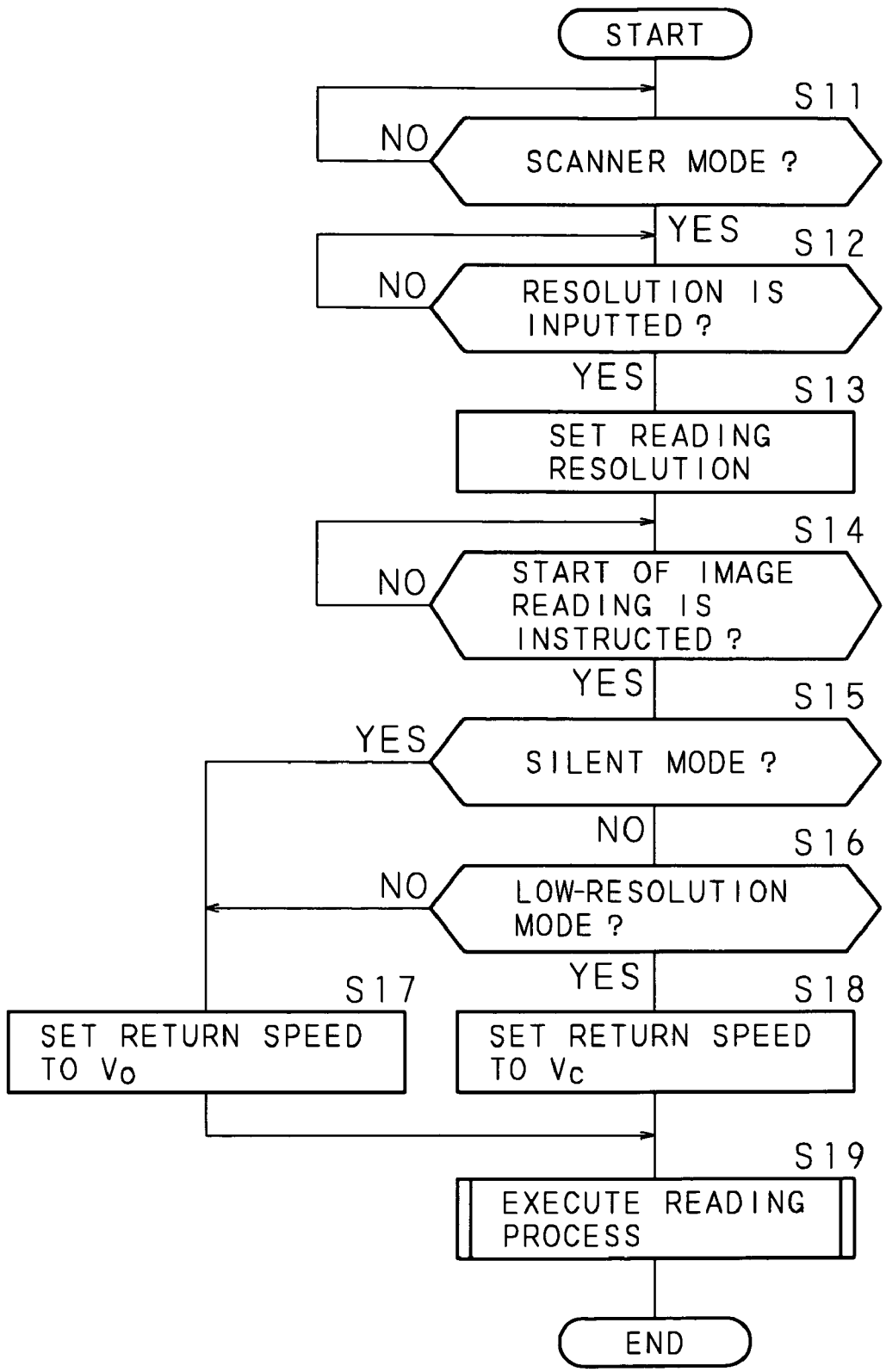
FIG. 9 is a flowchart to described steps of a mode setting process, a mode judging process and a return speed setting process according to a second embodiment of a composite apparatus that is one example of the image processing apparatus according to the second embodiment of the present invention.
Figure 10:
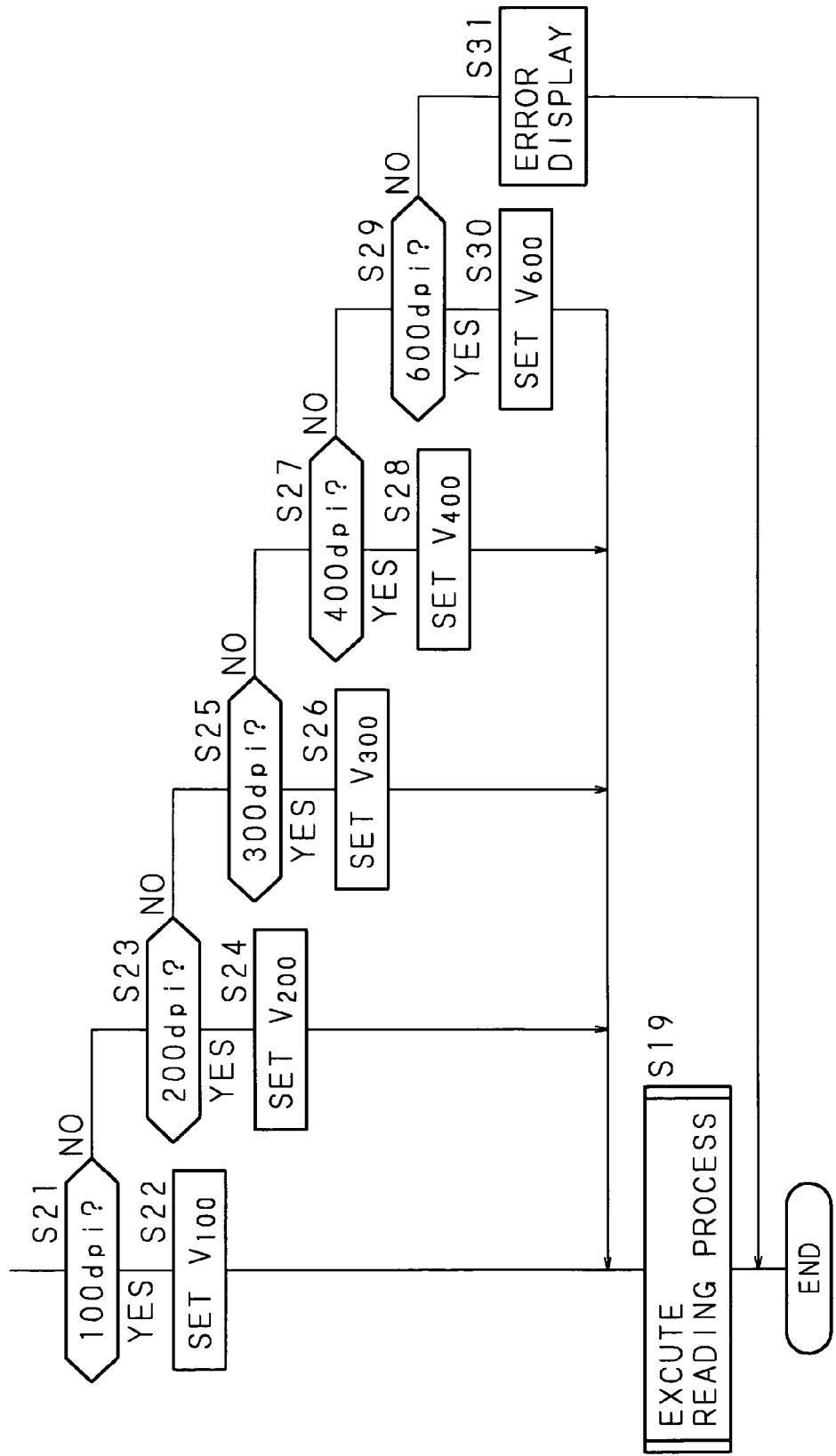
FIG. 10 is flowchart to describe steps of a return speed setting process according to a third embodiment of a composite apparatus that is one example of the image processing apparatus according to the third embodiment of the present invention.

In this case, processes after the step S16 of the flowchart shown in FIG. 9 are executed at steps S21 to S31 in a flowchart shown in FIG. 10. First, at step S21, it is judged whether a reading resolution is set at 100 dpi or not. When it is judged that the set reading resolution is 100 dpi, the return speed is set to $V_{100}$ (S22), and the reading process is executed at the step S19. Meanwhile, it is judged that the reading resolution is not 100 dpi, the process proceeds to step S23.

At S23, it is judged whether the reading resolution is 200 dpi or not like at the S21. When it is judged that the set reading resolution is 200 dpi, the return speed is set to $V_{200}$ (S24), and the reading process at the step S19 is executed. Meanwhile, when it is judged that the reading resolution is not 200 dpi, the process proceeds to step S25. Similarly, when the set resolutions are 300 dpi, 400 dpi, and 600 dpi, the return speeds are set to $V_{300}$, $V_{400}$ and $V_{600}$, respectively until at step S30.

Thus, when it is judged that the set reading resolution is not 600 dpi at step S29, it is judged that the resolution is not set. In this case, at step S31, an error information indicating that resolution is not set is outputted to a liquid crystal display 11 and the series of processes are terminated without executing the reading process.

In addition, since the first, second and third embodiments are only examples of the present invention, the embodiments can be appropriately varied within the same or equal scope of the present invention.

As described above, according to the image processing apparatus and the method for controlling return speed of the image reading unit of the present invention, the return speed of the image reading unit to the reference position after completion of the scanning is set to the different speeds according to the operation mode of the apparatus. Thus, the returning operation of the image reading unit is controlled at the such set speed. For example, when the apparatus operates in the operation mode in which the machine sound is small, the return speed of the image reading unit is reduced from the first return speed corresponding to the copy mode, so that the apparatus can operate without generating the machine sound at the time of the returning operation of the image reading unit that makes the user uncomfortable because of the noise. In addition, when the apparatus operates in the operation mode in which a loud machine sound is generated, the return speed of the image reading unit is maintained at the first return speed, so that the waiting time is reduced so as not to make the user feel uncomfortable.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. A method for controlling a return speed of an image reading unit of an image processing apparatus to a reference position, said image processing apparatus comprising said image reading unit for reading an image of a document by scanning the document placed on a document table, and a driving unit for moving said image reading unit from said reference position along the document in a predetermined direction, and operating in one of a plurality of operation modes, comprising the steps of:

judging a set operation mode when said image reading unit reads the image;
   selecting a speed corresponding to the judged operation mode, from a speed group including a plurality of speeds that have been predetermined according to the plurality of operation modes;
   setting a return speed of said image reading unit for returning to said reference position after completion of scanning to the speed corresponding to the judged operation mode; and
   controlling said driving unit based on the set return speed, wherein
   when said judged operation mode is a first scanning mode in which said image reading unit is moved for scanning at a predetermined scanning speed, a predetermined first return speed is set as the return speed, and
   when the judged operation mode is a second scanning mode in which said image reading unit is moved for scanning at a speed lower than the predetermined scanning speed, a second return speed lower than the first return speed is set as the return speed.

2. The method as set forth in claim 1, wherein
said first scanning mode is a mode in which when an instruction to read the image of the document at a predetermined resolution is inputted, said image reading unit is moved at the predetermined scanning speed, and
said second mode is a mode in which when an instruction to read the image of the document at a resolution higher than the predetermined resolution is inputted, said image reading unit is moved at a speed lower than the predetermined scanning speed.

3. The method as set forth in claim 1, wherein said image forming apparatus further comprises an image forming unit for forming an image on a predetermined recording medium based on the image of the document read by said image reading unit,
   said method further comprising the steps of:
   setting the first return speed as the return speed when said judged operation mode is an image forming mode in which said image forming unit executes the image forming process, and
   setting the second return speed as the return speed when said judged operation mode is a mode in which said image forming unit does not execute the image forming process.

4. The method as set forth in claim 3, wherein when said judged operation mode is a silent mode for reducing a noise generated in said judged operation mode, the second return speed is set as the return speed.

5. The method as set forth in claim 4, wherein said silent mode is one or more modes of a mode for reducing a noise generated in said image forming mode, a mode for reducing a noise generated when said scanner mode in which said image reading unit reads the image of the document is set, and a mode for reducing a noise generated when a facsimile transmission mode in which the image read by said image forming unit is transferred through a predetermined communication network is set.

6. An image processing apparatus comprising an image reading unit for reading an image of a document by scanning the document placed on a document table, and a driving unit for moving said image reading unit from a reference position along the document in a predetermined direction, and operating in one of a plurality of operation modes, comprising:

a mode setting unit that sets one of said plurality of operation modes;
   a mode judging unit that judges the operation mode set by said mode setting unit when said image reading unit reads the image;
   a return speed setting unit that sets a return speed of said image reading unit for returning to said reference position after completion of scanning, to a speed corresponding to the operation mode judged by said mode judging unit; and
   a drive control unit that controls said driving unit based on the return speed set by said return speed setting unit, wherein
   said return speed setting unit selects a speed corresponding to the operation mode judged by said mode judging unit, from a speed group including a plurality of speeds that have been predetermined according to the plurality of operation modes and sets the selected speed as the return speed,
   wherein when said mode judging unit judges a first scanning mode in which said image reading unit is moved for scanning at a predetermined scanning speed, said return speed setting unit sets a predetermined first return speed as the return speed, and when said mode judging unit judges a second scanning mode in which said image reading unit is moved for scanning at a speed lower than said predetermined scanning speed, said return speed setting unit sets a second return speed lower than said first return speed as the return speed.

7. The image processing apparatus as set forth in claim 6, wherein said first scanning mode is a mode in which when an instruction to read the image of the document at a predetermined resolution is inputted, said image reading unit is moved at the predetermined scanning speed, and said second mode is a mode in which when an instruction to read the image of the document at a resolution higher than the predetermined resolution is inputted, said image reading unit is moved at a speed lower than the predetermined scanning speed.

8. The image processing apparatus as set forth in claim 6, further comprising an image forming unit for forming an image on a predetermined recording medium based on the image of the document read by said image reading unit, wherein said return speed setting unit sets the first return speed as the return speed when said mode judging unit judges that an image forming mode in which said image forming unit executes an image forming process is set, and said return speed setting unit sets the second return speed as the return speed when said mode judging unit judges a mode in which said image forming unit does not execute the image forming process is set.

9. The image processing apparatus as set forth in claim 8, wherein when said mode judging unit judges that the operation mode set by said mode setting unit is a silent mode for reducing a noise generated in the set operation mode, said return speed setting unit sets the second return speed as the return speed.

10. The image processing apparatus as set forth in claim 9, wherein said silent mode is one or more modes of a mode for reducing a noise generated when said image forming mode is set, a mode for reducing a noise generated when a scanner mode in which said image reading unit reads the image of the document is set, and a mode for reducing a noise generated when a facsimile transmission mode in which the image read by said image forming unit is transferred through a predetermined communication network is set.

* * * * *